(No Model.)
J. J. STOPPLE.
COFFEE ROASTER.
No. 270,503.  Patented Jan. 9, 1883.
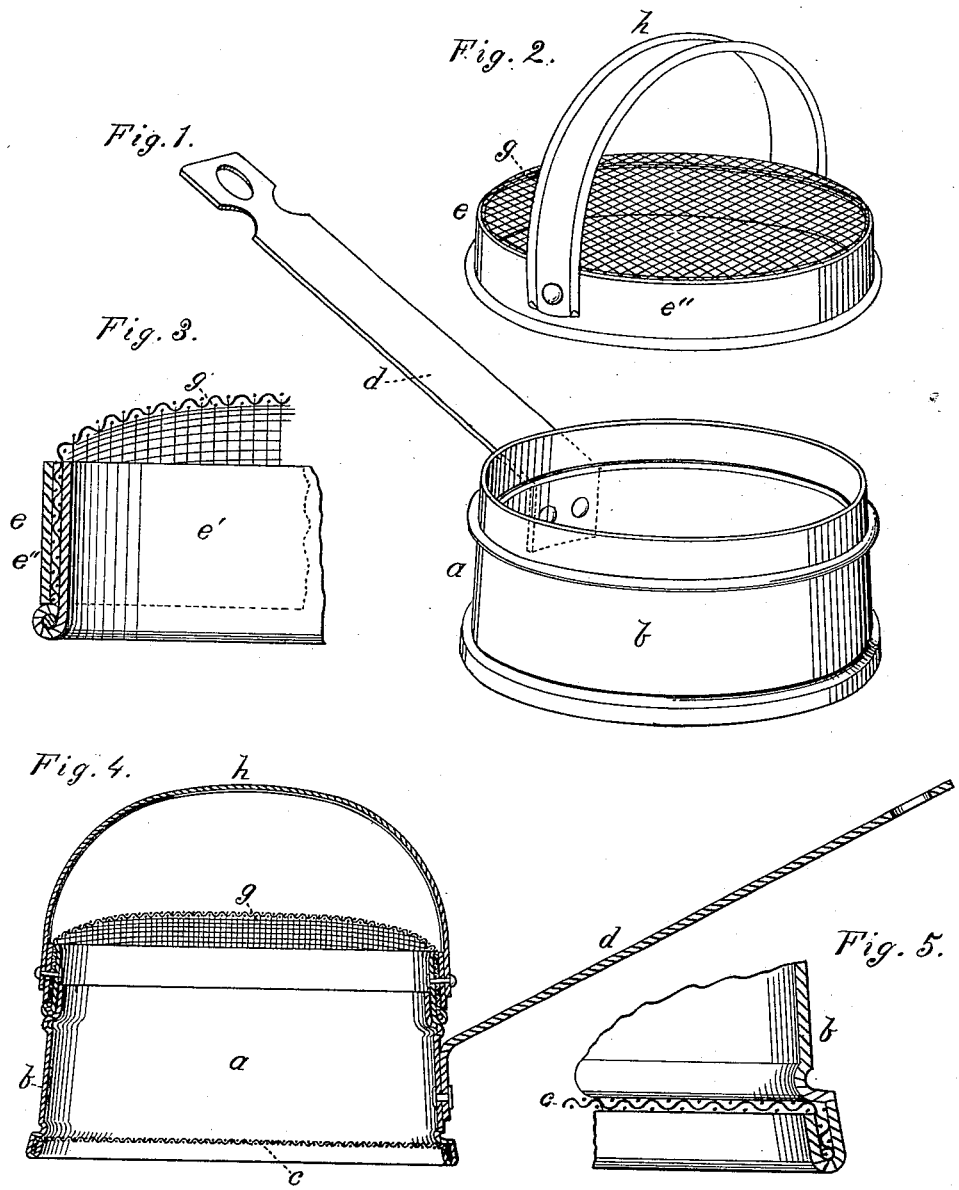
WITNESSES
Villetto Anderson
Philip C. Masi.
INVENTOR
J. J. Stopple
by Anderson and Smith
his ATTORNEYS

UNITED STATES PATENT OFFICE.

JOHN J. STOPPLE, OF BELLEVILLE, TEXAS.

COFFEE-ROASTER.

SPECIFICATION forming part of Letters Patent No. 270,503, dated January 9, 1883.

Application filed July 1, 1882. (No model.)

*To all whom it may concern:*

Be it known that I, JOHN J. STOPPLE, a citizen of the United States, and a resident of Belleville, in the county of Austin, and State of Texas, have invented a new and valuable Improvement in Coffee-Roasters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of the body of the coffee-roaster in a perspective view. Fig. 2 is a perspective view of the cover. Fig. 3 is a detail showing a section of the rings and wire-cloth composing the cover. Fig. 4 is vertical section of the coffee-roaster. Fig. 5 is a detail showing the manner of fastening the wire-cloth in the bottom of the roaster.

This invention has relation to utensils for roasting coffee; and it consists in the construction and novel arrangement of a vessel having a perforated or wire-cloth bottom, a side wall projecting below the same, and a side handle, and in connection therewith a lid or cover having a perforated or wire-cloth top and a transverse-bowed handle, all as hereinafter set forth.

In the accompanying drawings, the letter $a$ designates the body of the utensil, having the side wall, $b$, the lower edge of which is turned upward and inward to receive and hold the downwardly-turned edge of the perforated or wire-cloth bottom $c$. The side wall, $b$, therefore extends below the bottom $c$, and serves to support the latter above the top of the stove or heater when the vessel is placed thereon. The handle $d$ is firmly riveted to the side wall and extends outward therefrom laterally, as shown.

The cover $e$ consists of the inner ring, $e'$, outer ring, $e''$, and the perforated or wire-cloth top $g$, which is secured by its edge between these rings. Transversely over the top extends the bowed handle $h$, the ends of which are securely riveted to the rings $e'$ and $e''$.

The object of this invention is to provide a roasting utensil which can be used without a stirrer. The handles are so arranged as to enable the operator to shake it and move it upside down and about with great facility. The perforated or wire-cloth bottom and top allow the heat from the stove or fire to pass unobstructed to the coffee, so that a strong and uniform heat is applied. The wire-cloth bottom also acts as a sieve, relieving the coffee of dust, sand, small gravel, and hulls, and it does not scratch or burn the grains, as a solid bottom would do. The vessel therefore does not require more than ordinary attention while the coffee is being roasted, and the coffee is quickly and evenly parched.

Two bottomless cylinders having each a wire-gauze diaphragm and a side handle have been hinged at a point diametrically opposite the handles in order that they may be closed together to form a receptacle for the article to be roasted. A wire-gauze pan having a handle, strap-iron bottom-supports lying against and parallel to the bottom of the pan, and a closed cover has been used for roasting coffee and the like prior to my invention. I therefore claim neither of these constructions, broadly, herein.

Having described this invention, what I claim, and desire to secure by Letters Patent, is—

A coffee-roasting utensil consisting of the vessel $a$, having the side wall, $b$, extending below and turned inwardly and upwardly to secure a wire-cloth bottom, $e$, in place, a laterally-projecting handle, $d$, and a lid, $e$, composed of the inner and outer rings, $e'$ $e''$, the wire-cloth top $g$, and the bowed handle $h$, substantially as specified.

In testimony that I claim the above I have hereunto subscribed my name in the presence of two witnesses.

JOHN J. STOPPLE.

Witnesses:
 SAMUEL REESE BLAKE,
 CHARLES H. BROSSMANN.